US00RE45853E

(19) United States
(12) Reissued Patent
Neal et al.

(10) Patent Number: US RE45,853 E
(45) Date of Reissued Patent: Jan. 19, 2016

(54) OIL FILTERING AND COOLING SYSTEM FOR COMPRESSION IGNITION ENGINES

(71) Applicant: NEAL TECHNOLOGIES IP HOLDINGS, LLC, Mesa, AZ (US)

(72) Inventors: Gene Neal, Phoenix, AZ (US); Kennieth Neal, Mesa, AZ (US)

(73) Assignee: Neal Technologies IP Holdings LLC, Mesa, AZ (US)

(21) Appl. No.: 14/627,160

(22) Filed: Feb. 20, 2015

Related U.S. Patent Documents

Reissue of:
(64) Patent No.: 8,887,688
Issued: Nov. 18, 2014
Appl. No.: 13/427,778
Filed: Mar. 22, 2012

U.S. Applications:
(60) Provisional application No. 61/465,706, filed on Mar. 22, 2011.

(51) Int. Cl.
*F01M 5/00* (2006.01)

(52) U.S. Cl.
CPC ..... *F01M 5/00* (2013.01)

(58) Field of Classification Search
CPC ..... F01M 5/00
USPC ..... 123/196 R, 41.33; 184/104.3; 29/888.01
See application file for complete search history.

(56) References Cited

U.S. PATENT DOCUMENTS 3,223,197 A * 12/1965 Conover et al. ..... 184/6.28
4,324,213 A * 4/1982 Kasting et al. ..... 123/196 A
4,406,784 A 9/1983 Cochran
4,423,708 A * 1/1984 Sweetland ..... 123/196 AB
4,427,778 A * 1/1984 Zabriskie ..... 435/277
5,014,775 A * 5/1991 Watanabe ..... 165/167
5,363,823 A 11/1994 Gittlein
5,477,817 A * 12/1995 Hufendiek et al. ..... 123/41.33
5,896,834 A * 4/1999 Gruner ..... 123/41.33
6,182,616 B1 * 2/2001 Itoh et al. ..... 123/41.1
6,536,381 B2 * 3/2003 Langervik ..... F01P 3/20 123/196 AB
6,955,150 B2 * 10/2005 Moss ..... 123/196 AB
6,988,919 B2 1/2006 Tanaka et al.
7,213,542 B2 * 5/2007 Oshima et al. ..... 123/41.51
7,992,667 B2 * 8/2011 Rennie ..... 180/219

(Continued)

OTHER PUBLICATIONS

Sneed4Speed R53 Mini Oil Cooler Install Instructions. www.sneed4speed.com. Feb. 2, 2011.*

(Continued)

*Primary Examiner* — William Doerrler
(74) *Attorney, Agent, or Firm* — Hartman Titus PLC; John D. Titus

(57) ABSTRACT

An oil distribution and cooling system for diesel engines of the design represented by the 6.4L POWER STROKE® engine. The stock oil cooler and cover are removed and a manifold is positioned in place of the removed stock oil cooler and cover. The block has oil in, oil out, coolant in and coolant out ports which align with those on the engine. Coolant is directed to an adapter plate and a relocated oil cooler which may be the removed cooler or a replacement, preferably of the oil-to-air type. Oil to be filtered and cooled is directed through the manifold to a filter and then to the cooler. Cool, clean oil is returned to the manifold for distribution to various engine locations.

12 Claims, 9 Drawing Sheets

(56) References Cited

U.S. PATENT DOCUMENTS

| | | | | |
|---|---|---|---|---|
| 8,186,328 | B2 * | 5/2012 | Kiemlen et al. | 123/196 AB |
| 8,783,216 | B2 * | 7/2014 | Wilmink et al. | 123/41.33 |
| 2004/0132359 | A1 | 7/2004 | Tanaka et al. | |
| 2007/0137607 | A1 * | 6/2007 | Ledbetter | 123/196 AB |
| 2009/0107424 | A1 * | 4/2009 | Blassnitz et al. | 123/41.12 |

OTHER PUBLICATIONS

Mini Madness Engine Oil Cooler Installation Guide. www.mini-madness.com. Mar. 21, 2006.*
Liberator Performance remote oil cooler 6.0 liter Powerstroke product description, www.liberatorperformanceinc.com. May 30, 2006.*
DIY Remote Oil Cooler and Filter Complete (with pictures). www.ford-trucks.com/forum. Nov. 22, 2010.*
Laminova Oil to Water Heat Exchangers and Take Off Plates Products by Mocal. Iaminova Productions. May 13, 2005.*
Diesel Power Magazine dated Oct. 2010.
Blog: The Diesel Stop.com dated Jan. 2010.
Ford Power Stroke engine manual, (2003).
forum.miata.net blog dated Aug. 2007-Jun. 2011.
the370z.com blog dated Oct. 2010-Sep. 2011.
Correspondence from Protester with Exhibits, Oct. 13, 2015.
Sneed4Speed Mini Cooper R56 Oil Cooler Kit, Aug. 2015.
Bullet Proof Oil Cooler Kit Installation Manual (Dec. 23, 2009).
Blog Post by Hubler13f titled "DIY Remote Oil Cooler and Filter Complete (with pics)" dated Nov. 22, 2010 located at http://www.ford-trucks.com/forums/1012861-diy-remote-oil-cooler-and-filter-complete-with-pics.html.
Blg Post by Acetroncorp titled "Homemade Oil Cooler Project for 03 Power Stroke Diesel" (Date: Aug. 19, 2010 approx) http://www.acetroncorp.com/psd.htm.
Blog post by Young GUNS15 titled "12-Rail" dated Aug. 13, 2012 located at http://www.competitiondiesel.com/forums/showthread.php?t=139849.
Blog Post by "Killerbee" titled "Oil Cooler for the Duramax" Dated Dec. 19, 2005 located at www.dieselplace.com/forum/4-other-topics/32-truck-uses/56538-oil-cooler-duramax-6.html.
Blog post by "PPE" advertising "Oil Cooler Delete Kit" (Dec. 11, 2009) located at http://www.duramaxdiesels.com/forum/showthread.php?t=19432.
Blog Post by Maryland Performance Diesel dated Jan. 20, 2011 located at www.powerstrokenation.com/forums/showthread.php?t=88212&showall=1.
Advertisements for Liberator and Thoroughbred Diesel oil coolers and Exhaust Gas Recirculation (EGR) Cooler "delete" kits.

* cited by examiner

-PRIOR ART-

Manifold
112

Manifold
112

Oil Cooler Adapter Plate
190

Oil Cooler Adapter Plate
190

Oil Cooler Adapter Plate
190

OIL FILTERING AND COOLING SYSTEM FOR COMPRESSION IGNITION ENGINES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S)

This application claims the benefit of U.S. Provisional Patent Application No. 61/465,706 filed Mar. 22, 2011, the contents of which are hereby incorporated by reference.

TECHNICAL FIELD

The present example relates generally to lubrication systems and more specifically relates to oil cooling and filtration systems for diesel engines that may be provided as an original equipment manufacturer ("OEM") system. The present example also more specifically relates to a method of after-market modification to existing engines to enhance the lubrication system.

BACKGROUND

Diesel or compression ignition engines are widely used in both light and heavy duty trucks. The well known FORD® F Series and E Series vehicles may utilize diesel engines, such as the 6.0 L and 6.4 L POWER STROKE® engines. These type diesel engine designs may have an oil cooler that is mounted in the bed, or valley, on the top of the engine, beneath an oil filter which is typically a canister-style filter.

Oil is drawn from the oil pan or reservoir through a pick up tube and directed by an oil generated rotor ("gerotor") pump, or its equivalent, to the top mounted oil cooler and then to the oil filter. Oil to be cooled is routed to the oil cooler by passageways in the oil filter base. The stock oil cooler is a plate-style, liquid-to-liquid heat exchanger or cooler in which the oil to be cooled is in heat exchange relationship with engine coolant. The coolant from the engine cooling system passes through the oil cooler to extract heat from the oil. After exiting the cooler, the cooled and filtered oil is directed to various engine locations requiring lubrication and other locations such as the oil reservoir for the high pressure pump, the injection galleries, EOT and EOP sensors and to the turbo charger, if the engine is so equipped.

The oil distribution and cooling and filtration systems of conventional automotive diesel engines often present problems, as the oil cooler is top mounted in the engine valley on an oil filter base. The oil filter base includes an oil drain, to drain oil from the filter base during an oil change. If the oil drain becomes clogged, the result may be oil spillage during an oil change once the filter is removed. A faulty drain valve can also result in a critical and potentially damaging loss of lubricating oil.

Another problem with conventional oil cooler and filter systems is that these systems are expensive to repair and service. Space limitations present difficulty and obstruction to modifying the oil and cooling systems to enhance performance and engine durability.

As mentioned, diesel engines similar in construction to those described above, are widely used in automotive or highway applications. Diesel engines also have broad application and are used for marine, industrial, power generation and other mobile and fixed applications. These types of diesel engines often encounter the same or similar problems with lubrication systems as described with reference to automotive applications.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides an improved oil distribution, filtering and cooling system which is particularly adapted to automotive diesel engines of the general type described above. The improved oil cooling and filtering system of the present example may be an OEM installation or may be retrofitted to an existing diesel engine, and includes a uniquely constructed manifold which, in one example, replaces the stock oil cooler and oil cooler cover. The manifold is mounted in place of the stock engine oil cooler which is removed. The configuration of the replacement manifold allows utilization of OEM gaskets and mounting hardware to facilitate installation.

Filtered oil is routed by the replacement manifold to an adapter plate having inlet and outlet ports for oil and inlet and outlet ports for engine coolant. The adapter plate mounts on an oil cooler. The oil and coolant ports in the adapter plate align with the corresponding ports in an oil cooler. The cooler may be the stock cooler which has been relocated from another engine location such as on the bed of the engine or may be a replacement cooler, preferably of the air-to-oil type. The adapter plate attaches to the cooler to direct oil and coolant through the cooler and returns these fluids to the manifold and to the engine. Multiple oil coolers of either the liquid-to-liquid or liquid-to-air type may be utilized depending on system requirements and space restrictions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe an oil cooling and filtration system. Although the present examples are described and illustrated herein as being implemented in a diesel engine system, the system described is provided as an example and not a limitation. As those skilled in the art will appreciate, the present examples are suitable for application in a variety of different types of engine systems.

Figure 1:
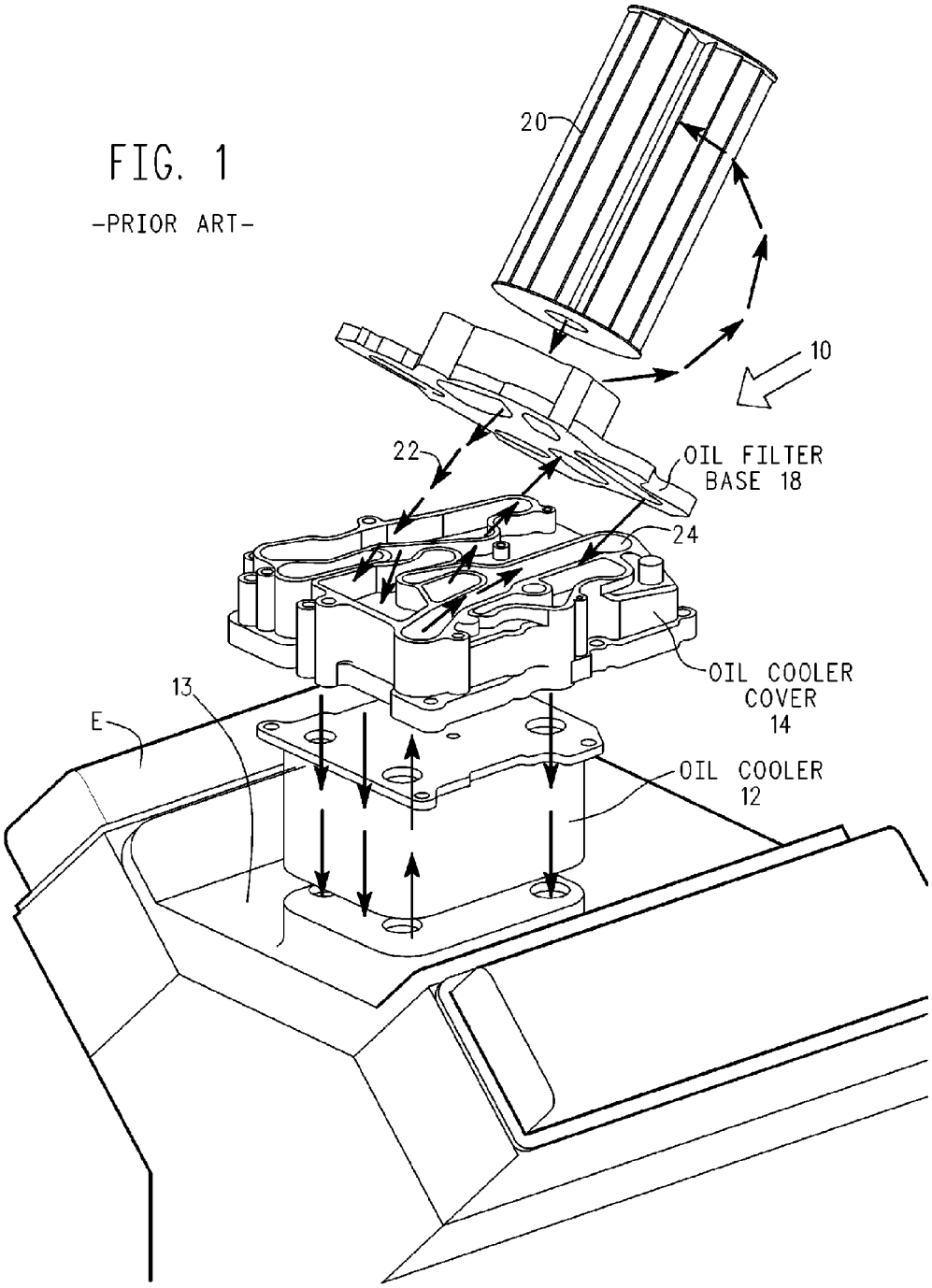
FIG. 1 is a perspective view showing a standard or stock top-mounted oil cover, cooler and filter as provided by the automotive manufacturer and found on engines such as the FORD® 6.4 L F Series POWER STROKE DIESEL®.

FIG. 1 is a perspective view showing a standard or stock top-mounted oil cover, cooler and filter which forms a standard oil filtration and cooling system as typically provided by the automotive manufacturer. FIG. 1 is representative of parts that might be found on a FORD® F Series POWER STROKE® 6.4 L diesel engine, but is representative of other oil distribution and lubrication systems to which the present example may be applied.

The stock system 10 utilizes a liquid-to-liquid stacked plate heat exchanger or cooler 12 mounted in the valley (13) of the engine E. The engine oil is pumped by an oil pump (not shown) to the oil cooler cover 14 where it is directed to the cooler 12. A coolant pump (not shown), directs coolant to the heat exchanger 12, where it flows through the aluminum fins and divider plates separating the oil and coolant in the cooler 12 to cool the oil circulating through the cooler. The cooled oil is then directed to the oil filter base 18 where it next enters the oil filter 20. After filtration, the cool and clean oil is directed at 22 to various engine lubrication circuits for lubrication or for actuation of electro-hydraulic fuel injectors and to engine oil temperature ("EOT") and engine oil pressure ("EOP") sensors.

There are several problems that many vehicle owners and operators can experience with stock lubrication systems of this type. The stock oil-to-coolant oil cooler 12, is typically a stacked plate and fin design which inherently defines numerous small fluid passageways which are susceptible to easily becoming blocked or obstructed over a period of use.

Another problem with the standard design is that the top mounted cooler does not afford convenient service access and its construction does not facilitate servicing or system modification which may be desirable to enhance oil cooling. The stock system has a cartridge-type filter 20 located on the top of the engine with a drain back valve (not shown) and passage 24 to drain the filter housing. In the event the drain 24 becomes clogged, oil spillage can occur during servicing or repair. The drain back valve can also become damaged or stuck "open," causing loss of oil to the engine.

Figure 2:
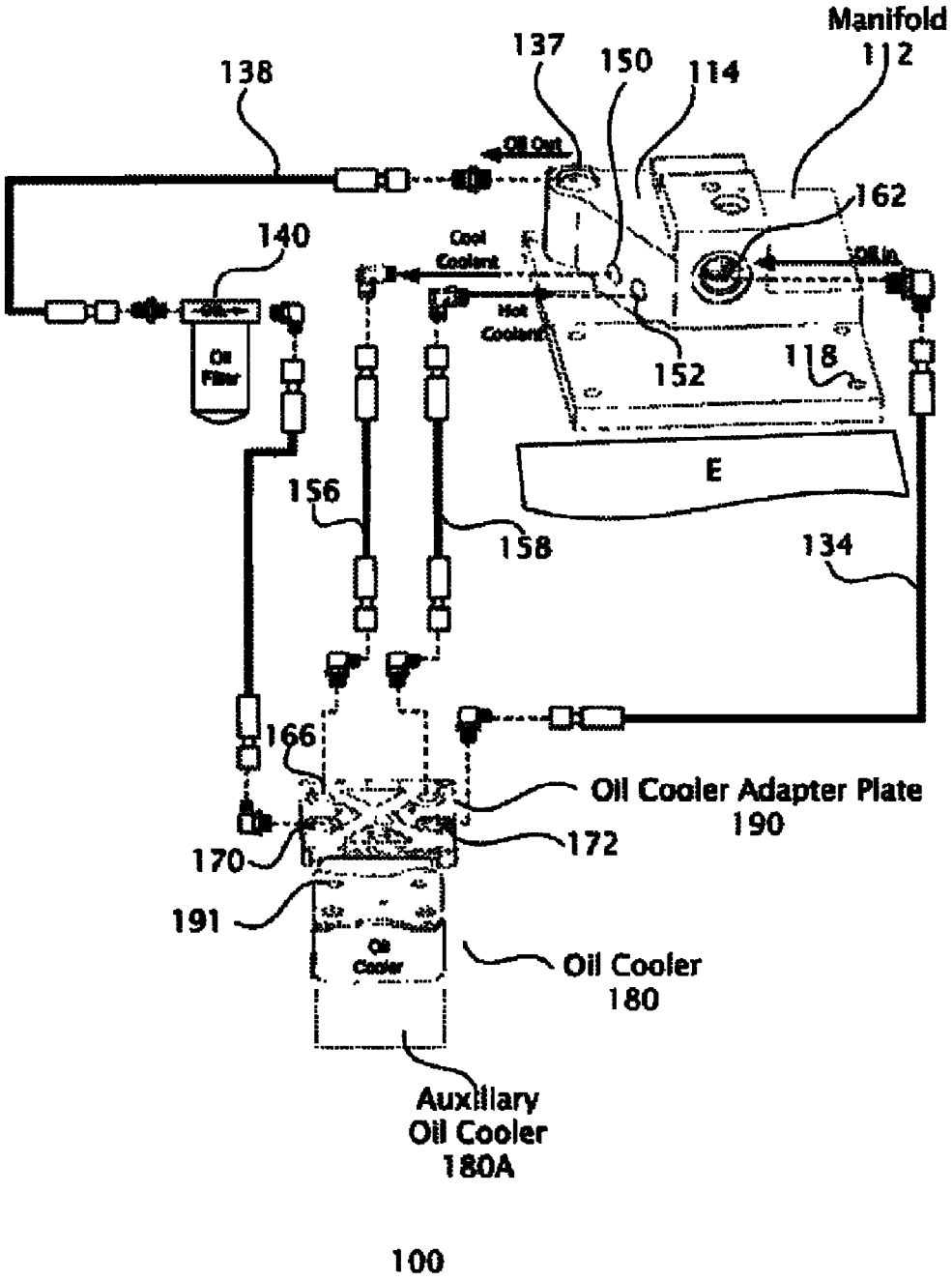
FIG. 2 is a schematic of an example of the improved oil filtering and cooling system of the present example.

FIG. 2 is a schematic diagram showing the unique oil filtering and cooling system 100 of the present example, which may replace a stock oil filtration and cooling system on a representative engine E, such as an exemplary a 6.4 L POWER STROKE® diesel. The Applicants' system 100 may be provided as a stock system, or a modification or replacement of a stock system including that of the type previously described in FIG. 1. The fittings and hoses shown are exemplary and may be changed, altered or otherwise equivalently changed to couple the components in a desired application. The unique oil filtration and cooling system of the present example is generally designated by the numeral 100 and includes a specially designed manifold 112, an oil cooler adapter plate 190 coupled to a remotely mounted oil cooler 180, and a remotely mounted oil filter 140. Remote mounting of the oil filter 140, and oil cooler 180, can allow for the alleviation of the before mentioned problems with a stock system, including accessibility, improved cooling and spill prevention.

Specially designed manifold 112, which mounts in the valley of the engine E replacing the conventional oil cooler and cover normally in this location. The specially designed manifold 112 couples to existing bolt patterns on an engine block, Manifold 112 also couples to engine coolant passageways and oil passageways disposed in engine E. Engine oil may be routed to an externally disposed filtration device, and then to an externally mounted oil cooler 180. Also, coolant may be routed to an externally mounted oil cooler 170. A plurality of mounting bores, such as the exemplary mounting hole 118 are provided to align with the existing mounting location on the engine E to match those of the stock cooler.

The manifold 112 may include, an oil out port 137 which receives oil from the crankcase. Crank case oil is routed away from the engine through port 137 via oil line 138 coupled to the oil filter 140.

Oil filter 140 may be conventionally constructed and include a suitable mounting fixture, if of the "spin on" type. Alternatively the filter may be a cartridge type filter, with an external cover. Oil filter assembly 140 includes an oil out port where filtered oil may be coupled via supply line 139 to an oil cooler input port 170 provided on the oil cooler adapter plate 190.

The oil cooler 180, may be a stock oil cooler 180, or its equivalent, remotely mounted. The oil cooler 180, may be coupled to an oil cooler adapter plate 190, that, in the case of a stock oil cooler, reproduces the mounting configuration of the engine E. Filtered and cooled oil exits the oil cooler 180 at port 172 and is routed back to the specially designed manifold plate 112, via supply hose 134. Supply hose 134 couples to the oil input port 162.

Coolant is also routed by specially designed manifold 112. Coolant from the engine cooling system is received by the manifold 115 at a port 162 which aligns with the coolant port at the mounting location of the removed stock oil cooler.

Cool coolant is directed by the manifold through port 150 through coolant line 156. Line 156 connects to port 166 in the adaptor plate 190 which is mounted to cooler 180. Port 166 aligns with the coolant in port 191 on the cooler. Similarly, hot coolant returning to the engine E after passage through the cooler 180 returns via line 158 to manifold port 152.

Figure 6:
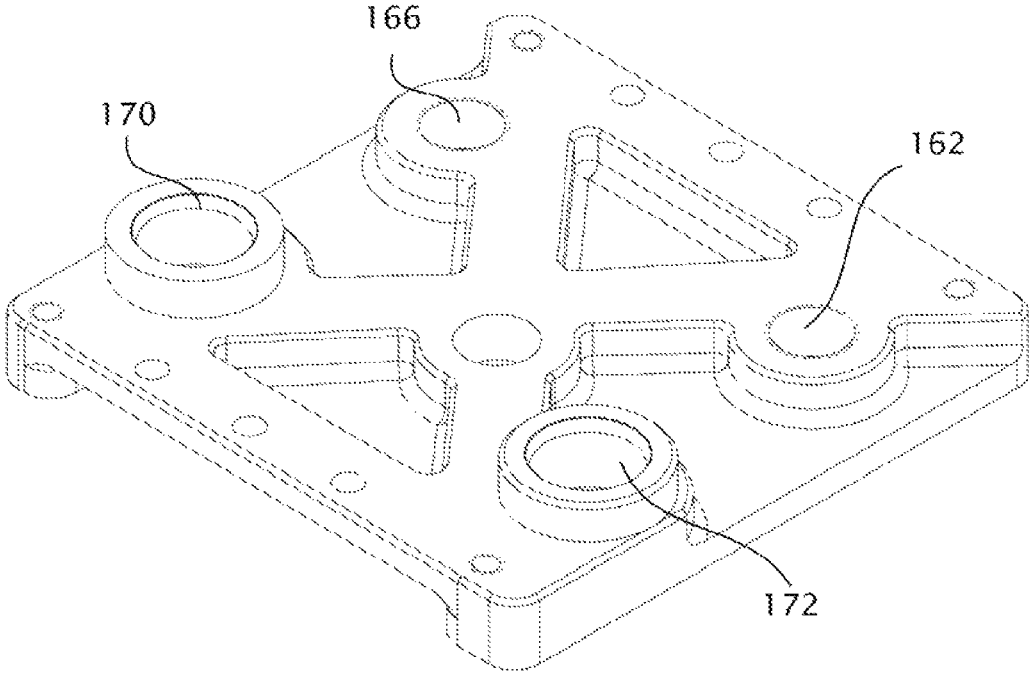
FIG. 6 is a top perspective view of the oil cooler adapter plate which mounts on and is compatible with existing oil cooler engine mountings.
Figure 7:
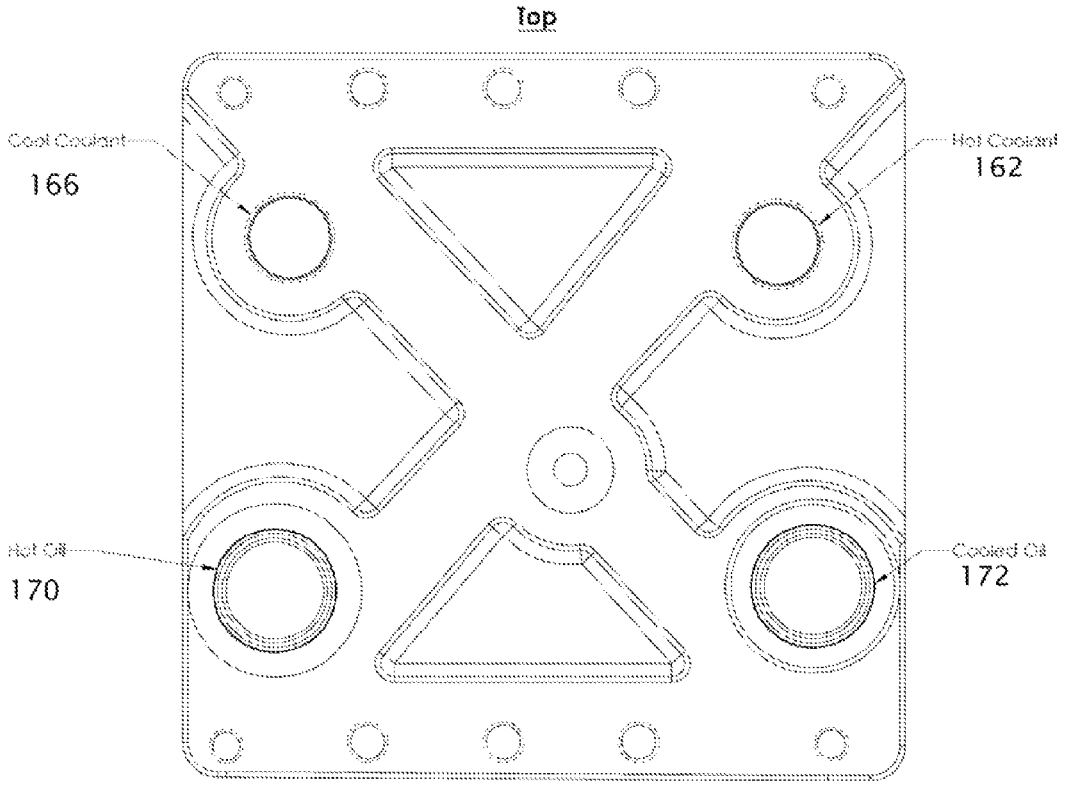
FIG. 7 is a plan view showing the top side of the adapter plate utilized in the system of the present example.
Figure 8:
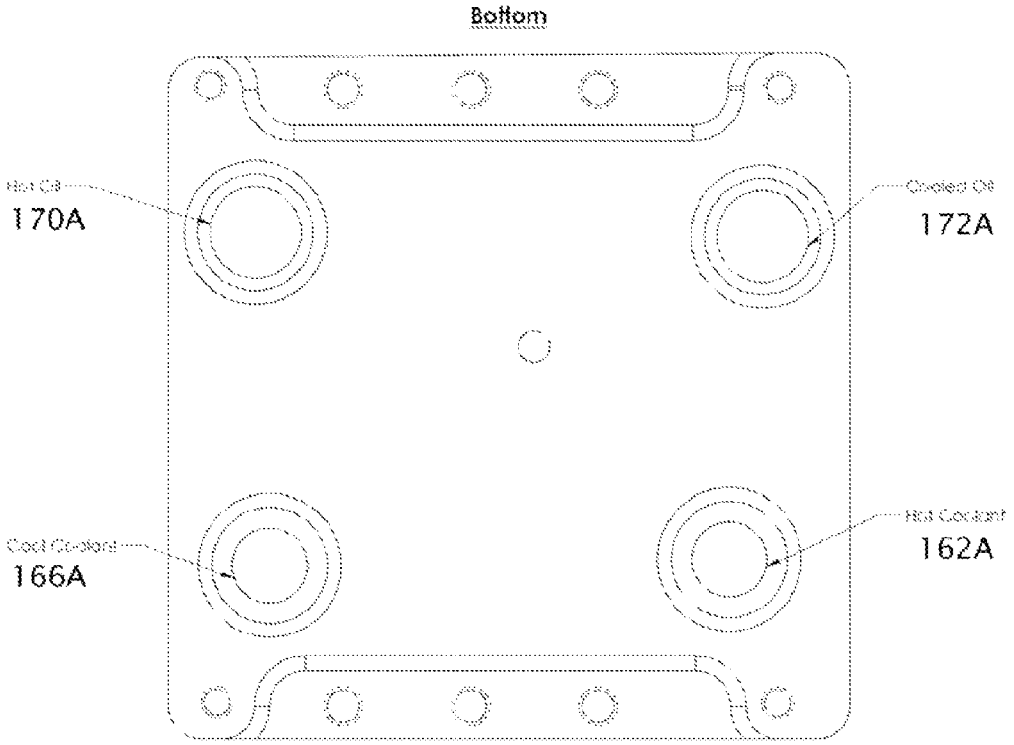
FIG. 8 is a bottom plan view of the adaptor plate shown in FIG. 6.

The cooler 180 is mounted to adapter plate 190, as described and seen in FIGS. 6, 7 and 8, having hot oil inlet 170 and cool oil outlet ports 172.

The cooler 180 can be mounted or relocated in a suitable location such as on the vehicle bumper or other location in the engine compartment, such as on the condenser, to provide maximum heat transfer and serviceability. The cooler 180 may be the stock oil-to-coolant cooler removed from the top of the engine E and relocated or may be a replacement cooler preferably of the air-to-oil type.

If the cooler 180 is a replacement air-to-liquid cooler, preferably it is a tube and fin style with the oil passing through the tubes and cooled by the passage of air through the cooler. The engine fan operates to move air through the oil cooler if the cooler 180 is properly placed rearward of the condenser so that even under extended idle conditions, the engine fan will provide an adequate airflow through the cooler across the heat exchange tubes.

The enhanced cooling provided by the system tends to eliminate the problem of early system failure and engine wear due to overheated engine oil. Mixing of coolant and oil may also avoided as the cooler is an air-to-liquid cooler. Engine oil temperatures are independent of coolant temperatures and adequate coolant supply which, if not proper, would be harmful to a conventional coolant-based oil cooling system.

The oil filtering and cooling system of the present example is highly versatile. For example, additional oil coolers 180A can be added to the system for increased cooling. This can be accomplished by installing multiple coolers 180, 180A in series, as shown in dotted lines in FIG. 2, each would be located for optimum airflow across the heat exchange element. The additional coolers may be either oil-to-air, oil-to-coolant or a system utilizing both.

Figure 3:
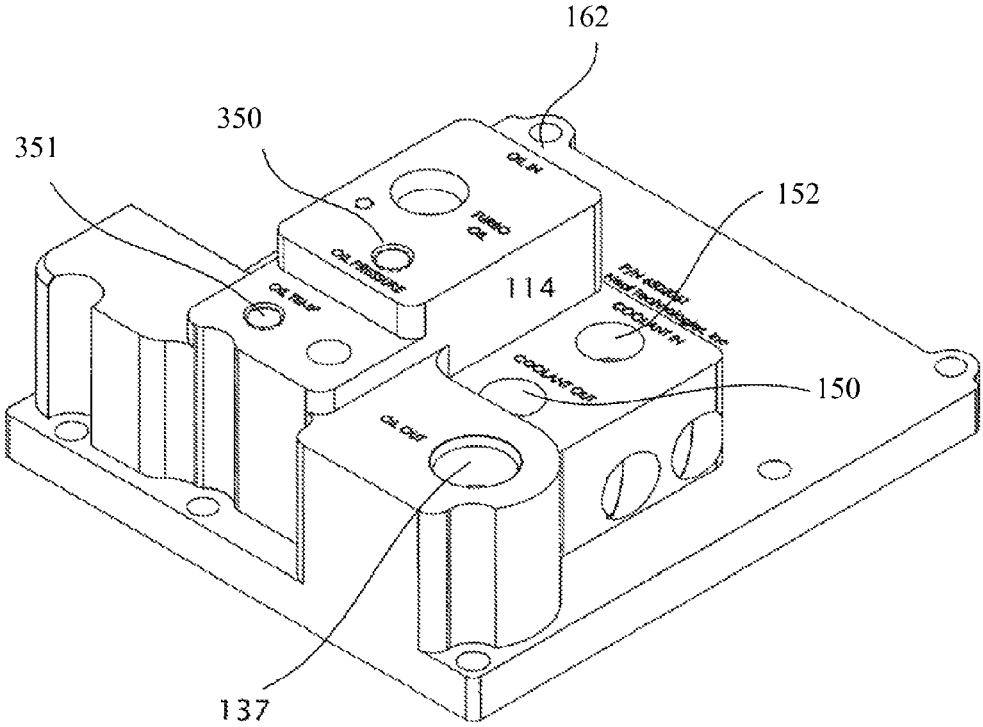
FIG. 3 is a perspective view of the oil and coolant manifold utilized in the present example replacing the stock cooler and cover.

FIG. 3 is a perspective view of the oil and coolant manifold 112 utilized in the present example replacing the stock cooler and cover. The manifold 112 has a body 114 constructed of steel, aluminum or other suitable material. The body 114 of the manifold includes, an oil out port 137, an oil in port 142 which receives filtered and cooled oil from the cooler.

The fully filtered and cool oil is returned to the manifold at port 142 and is then directed by the manifold 115 to the various engine oil circuits. A high pressure, stainless steel oil pump filter screen may be integrated internally in the body 114 of the manifold in one of the oil passages to provide additional protection.

Coolant exits the manifold from port 150, and subsequently returns via port 152. Provision is made to allow the mounting of one or more sensors including an oil temperature sensor at location 351 and an oil pressure sensor at location 350.

Figure 4:
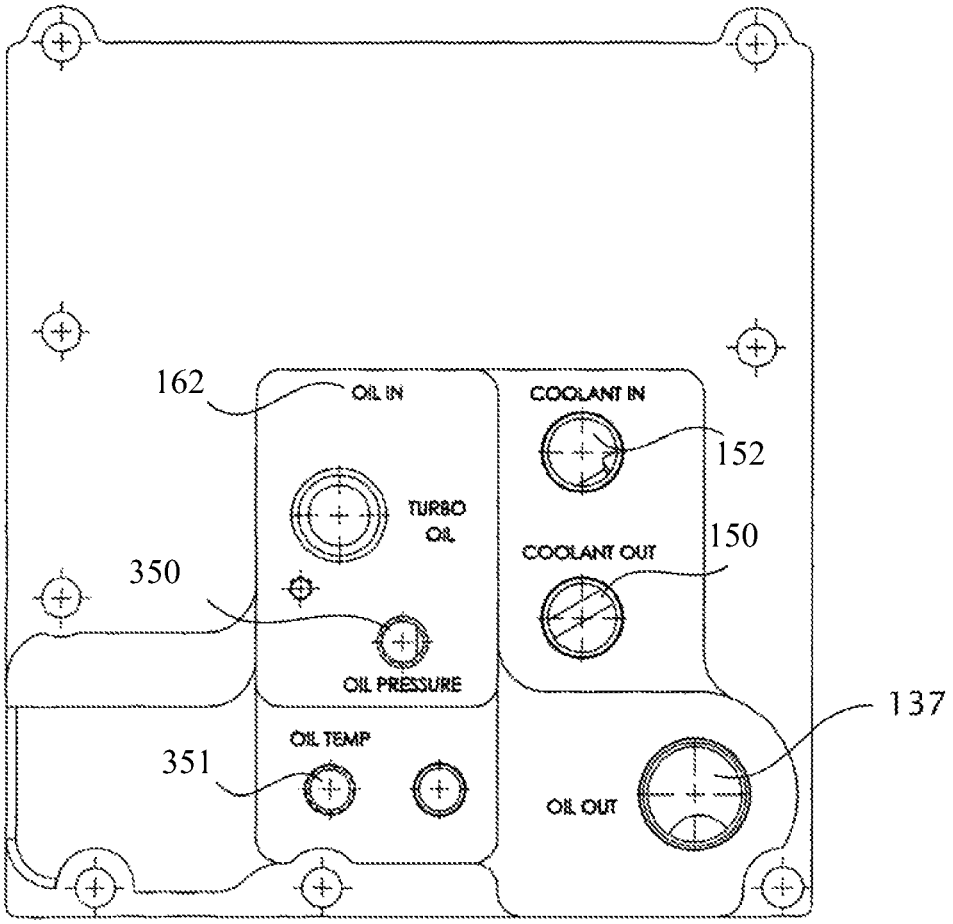
FIG. 4 is a top view of the manifold shown in FIG. 3.

FIG. 4 is a top view of the manifold 112 shown in FIG. 3 providing a better view of ports 137, 162, 150, 152, 350 and 351. Typically these ports may be threaded for accepting sensor modules and mating threaded couplers. Alternatively other suitable connections may be provided. Ports 350, 351 for EOP and EOT sensors are preferably located in the top of the manifold.

Figure 5:
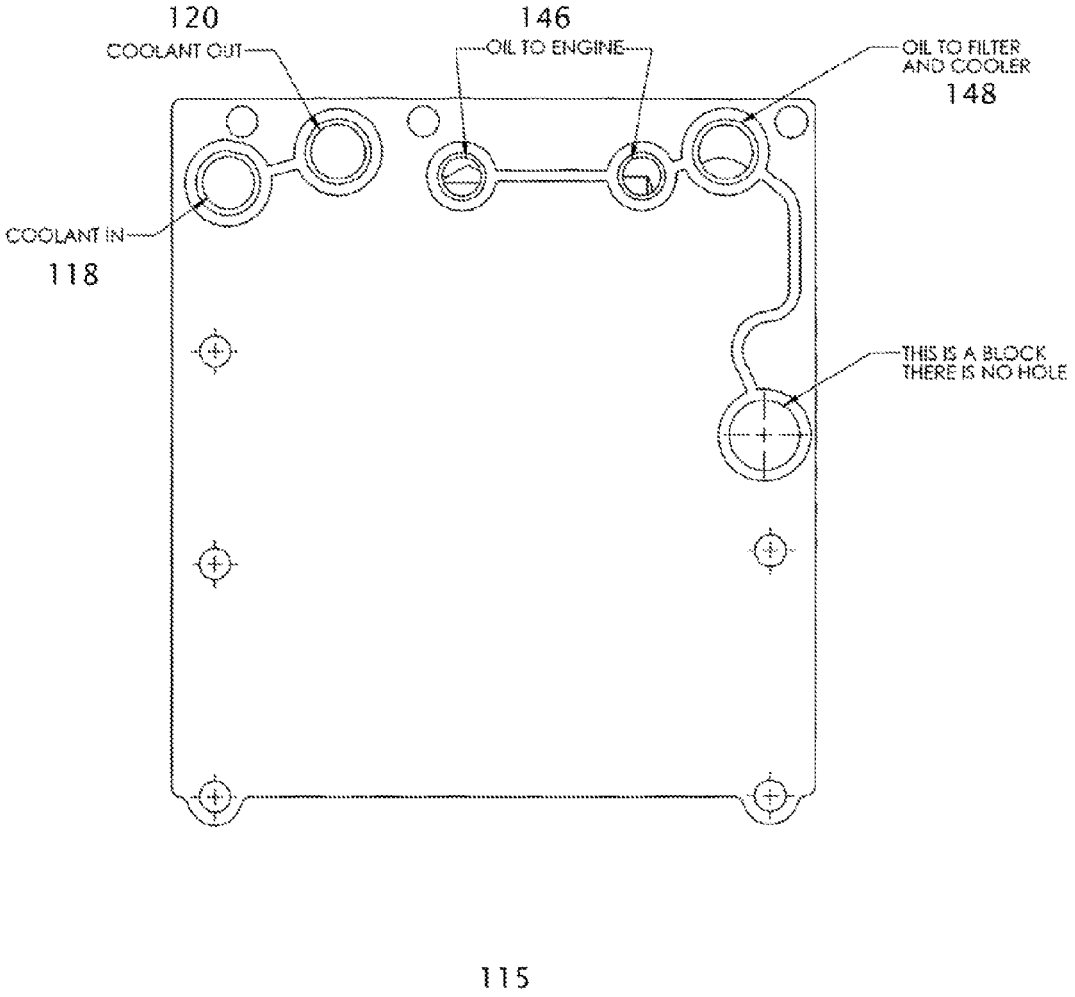
FIG. 5 is a bottom plan view of the manifold shown in FIG. 3.

FIG. 5 is a bottom plan view of the manifold 112 shown in FIG. 3. Coolant in 118 and coolant out 120 ports are shown in the bottom or base view 115. The various port locations align with the corresponding ports located in the engine valley location (E of FIG. 2), where the stock cooler and cover have been removed.

The manifold 112 also has oil ports 146 for supplying oil to the engine, which ports aligns with the existing clean and cooled oil ports on the engine block E for distribution to the various engine locations. The manifold 112 may include port 148 where oil passes out of the manifold 112, and then into the oil filter (140 of FIG. 1).

FIG. 6 is a top perspective view of the oil cooler adapter plate 190 which mounts to a stock engine oil cooler (180 of FIG. 2) and is compatible with existing oil cooler engine mountings. FIG. 7 is a plan view showing the top side of the adapter plate utilized in the system of the present example showing the same connections. Hot oil flows into the cooler adapter plate 190 at port 170. Low temperature coolant is coupled to adapter at port 166, and leaves after flowing through the attached cooler via port 162 for hot coolant. Cooled oil leaves from the cooler via adapter plate port 172, where it returns to the engine.

FIG. 8 is a bottom plan view of the oil cooler adaptor plate 190. The bottom side of the plate, has coolant inlet and outlet ports 162A, 166A which may be disposed parallel to the corresponding ports in the cooler and oil ports 170A and 172A.

Figure 9:
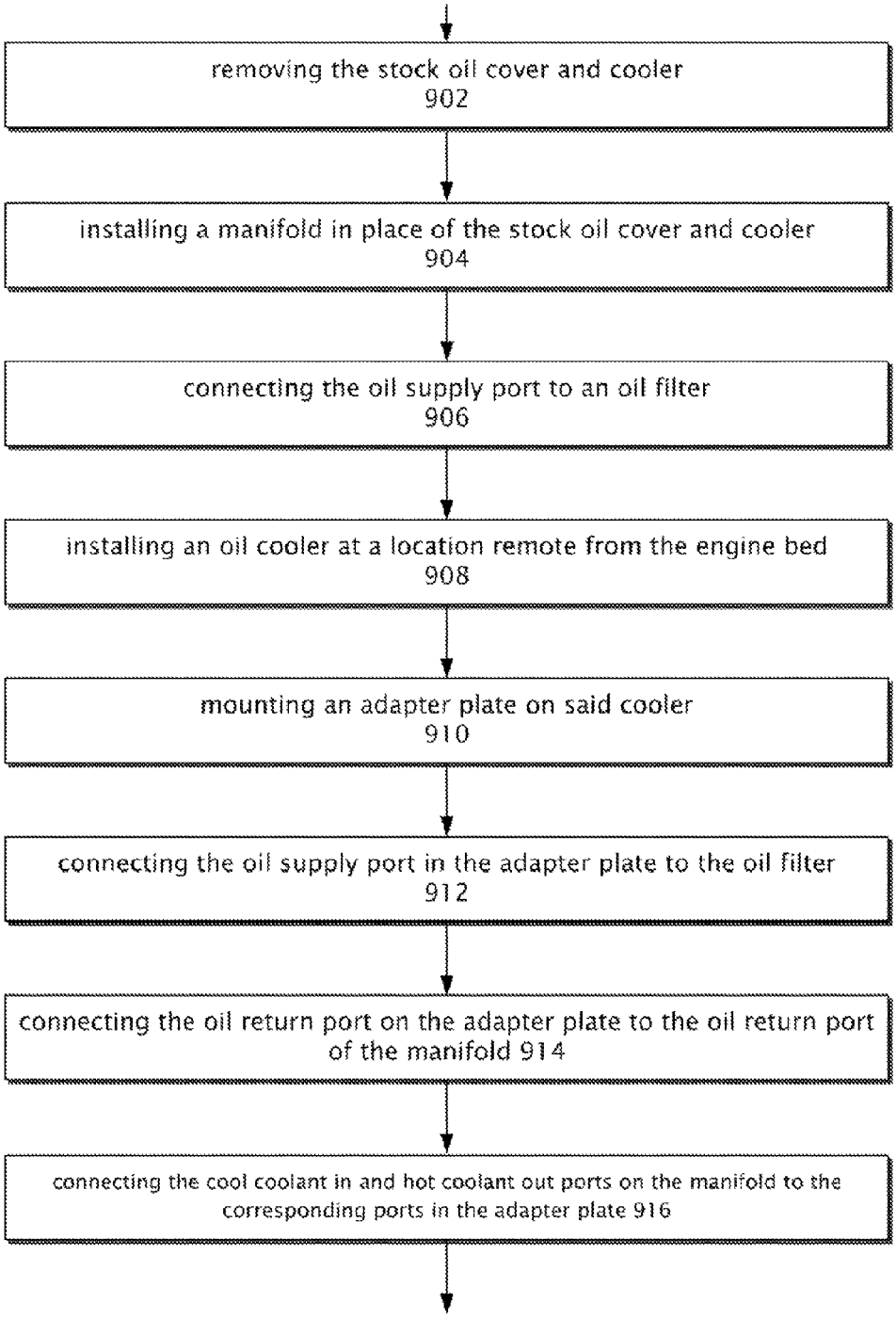
FIG. 9 is a flow diagram showing a process of modifying an oil distribution and cooling system for a stock diesel engine having an oil cover and cooler mounted in the bed of the engine.

FIG. 9 is a flow diagram showing a process of modifying an oil distribution and cooling system for a stock diesel engine having an oil cover and cooler mounted in the bed of the engine. At block 902 the stock oil cover and cooler is removed. At block 904 a manifold in place of the stock oil cover and cooler, the manifold having oil supply and coolant supply ports aligning with existing passageways on the engine bed, said manifold having a coolant return port and an oil return port aligning with the corresponding ports in the engine bed is installed. At block 906 the oil supply port to an oil filter is connected. At block 908 an oil cooler may be installed at a location remote from the engine bed. At block 910 an adapter plate may be mounted on the cooler having oil supply and oil return ports and coolant supply and coolant supply ports. At block 912 the oil supply port in the adapter plate may be connected to the oil filter. At block 914 the oil return port on the adapter plate may be connected to the oil return port of the manifold. At block 916 the cool coolant in and hot coolant out ports on the manifold may be connected to the corresponding ports in the adapter plate.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A method of modifying an oil distribution and cooling system for a liquid-cooled diesel engine, the engine having an original equipment oil cooler cover and an original equipment oil cooler mounted at an original location proximal the upper end of the engine in the engine valley, the engine further having an oil pump for circulating oil and a water pump for circulating coolant, the original equipment oil cooler comprising a liquid-to-liquid heat exchanger, said method comprising:

removing the original equipment oil cooler cover and oil cooler from the engine;

attaching a modified non-stock manifold to the engine in the engine valley, in the original location of the removed original equipment oil cooler, the manifold having oil supply and coolant supply ports aligning with existing passageways in the engine which supplied oil and coolant to the removed original equipment oil cooler, the oil supply port receiving a flow of oil from the engine oil pump, the coolant supply port receiving a flow of coolant from the engine water pump, the manifold further comprising coolant return and oil return ports aligning with existing passageways in the engine which returned oil and coolant from the removed original equipment oil cooler to the engine;

installing an oil cooler *with an adapter plate* at a location remote from the engine[; mounting an adapter plate to said oil cooler], the adapter plate having a hot oil inlet port, a cool oil outlet port, a cool coolant inlet port and a hot coolant outlet port[;], *the adapter plate further having:*

[attaching] (*a*) an external oil supply line *operatively attached* to the hot oil inlet port of the adapter plate to provide a flow of oil from the manifold to the oil cooler;

[attaching] (*b*) an external oil return line *operatively attached* to the cool oil outlet port of the adapter plate to provide a return flow of cooled, [filtered] oil from the oil cooler to the engine;

[attaching] (*c*) an external coolant supply line *operatively attached* to the cool coolant inlet port of the adapter plate to provide a flow of coolant from the manifold to the oil cooler; and

[attaching] (*d*) an external coolant return line *operatively attached* to the hot coolant outlet port of the adapter plate to provide a return flow of coolant from the oil cooler to the engine.

2. The method of claim 1, further comprising:

installing an oil filter interconnected between the manifold and the oil cooler.

3. The method of claim 1, wherein:

the engine is a Ford diesel engine.

4. The method of claim 1, wherein:

the engine is a Ford 6.0 L Power Stroke diesel engine.

5. The method of claim 1, wherein:

the engine is a Ford 6.4 L Power Stroke diesel engine.

6. The method of claim 1, wherein:

the oil cooler is a plate-type oil cooler.

7. The method of claim 1, wherein:

the oil cooler is a tube-and-fin type oil cooler.

8. The method of claim 1, wherein:

the existing passageways in the engine which supplied oil to the removed original equipment oil cooler are in a common horizontal plane.

9. The method of claim 1, wherein:

the existing passageways in the engine which supplied coolant to the removed original equipment oil cooler are in a common horizontal plane.

10. The method of claim 1 wherein the oil cooler is an original equipment oil cooler removed from the engine, which is reinstalled at a location that is distal from the original location on the engine.

11. The method of claim 1 wherein the oil cooler is an air-to-liquid cooler.

12. The method of claim 1 wherein multiple oil coolers are installed and interconnected.

* * * * *